B. C. MENDENHALL.
FENDER FOR SEEDERS AND PLANTERS.
APPLICATION FILED JAN. 20, 1916.
1,222,884.
Patented Apr. 17, 1917.
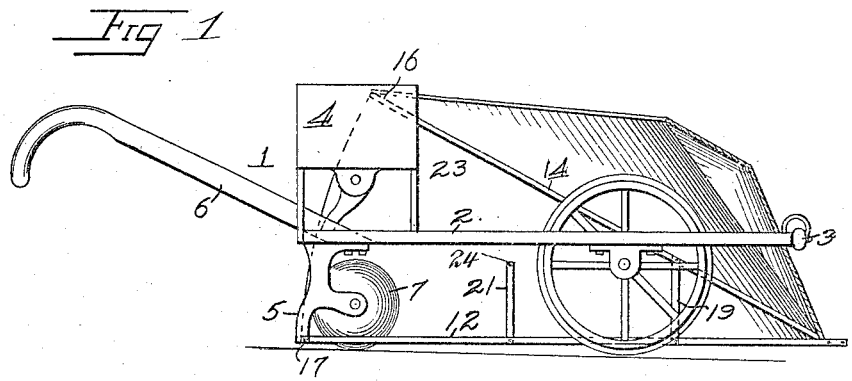
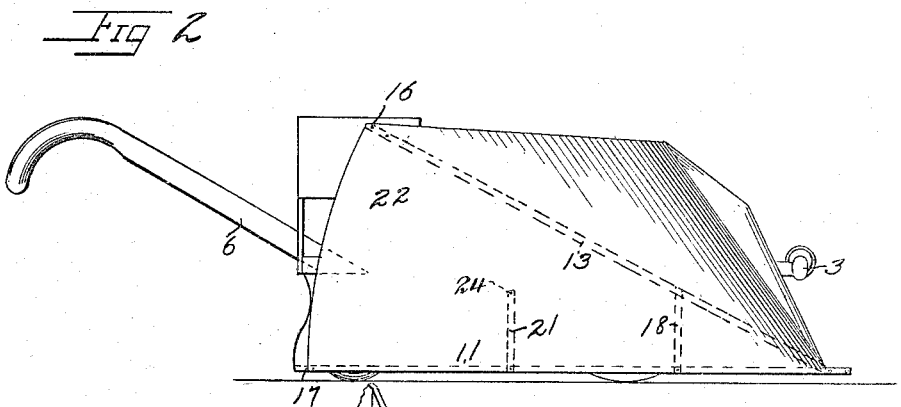
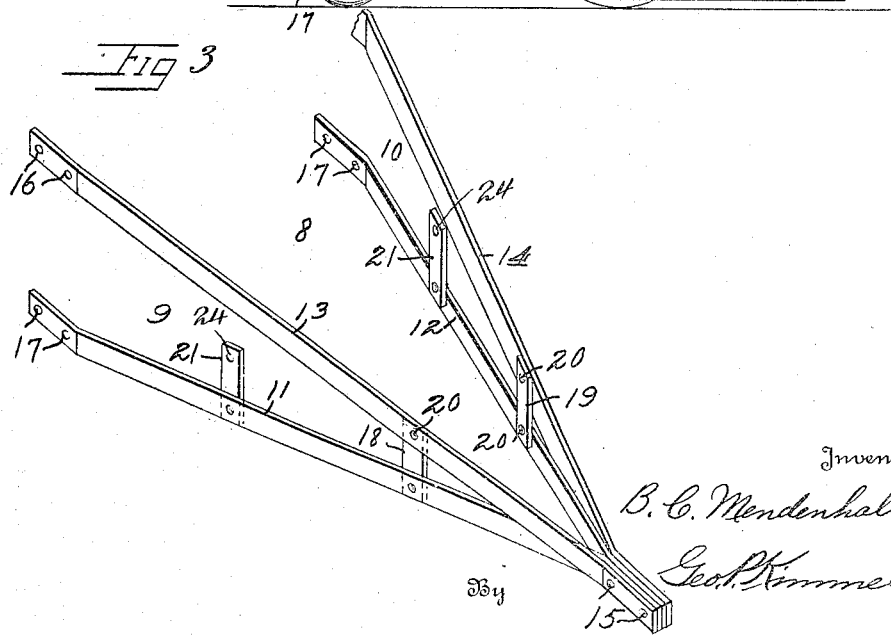
Inventor
B. C. Mendenhall
Geo. F. Kimmel
By
Attorney

UNITED STATES PATENT OFFICE.

BARZILLAI C. MENDENHALL, OF PARKER, INDIANA.

FENDER FOR SEEDERS AND PLANTERS.

1,222,884. Specification of Letters Patent. Patented Apr. 17, 1917.

Application filed January 20, 1916. Serial No. 73,198.

*To all whom it may concern:*

Be it known that I, BARZILLAI C. MENDENHALL, a citizen of the United States, residing at Parker, in the county of Randolph and State of Indiana, have invented certain new and useful Improvements in Fenders for Seeders and Planters, of which the following is a specification.

This invention relates to new and useful improvements in agricultural machinery and has particular reference to a new and improved fender for seeders and planters.

An object of this invention is to provide a device of the character described, which is simple in construction, cheap to manufacture, strong and durable, and effective in operation.

Another object of this invention is to provide a deflecting or guard member for either permanent or detachable connection with a seeder, planter, or the like, for removing weeds or other obstacles from the path of the planter, being particularly adapted for use when planting wheat in a corn field, the device serving to raise or brush aside weeds, fallen corn stalks, and the like.

Other objects and advantages will appear from the following detail description and claims, and from the accompanying drawings, in which—

Figure 1 is a longitudinal sectional view of my improvement;

Fig. 2 is a side elevation of a planter showing my improved deflector associated therewith; and Fig. 3 is an enlarged perspective view of the supporting frame.

Referring more particularly to the drawings, wherein similar reference characters designate like and corresponding parts, 1 designates in its entirety the planter having the usual draft tongue or beam 2 provided with a swingletree 3 or some suitable coupling device. The seed box is designated 4 and the drill 5. A pair of guiding handles 6 extend rearwardly and the usual disks 7 are carried by the drill frame. The structure refered to in the preceding sentences is the usual planter structure and forms no material part of the present invention.

My invention embodies a substantially semi-pyramidal supporting structure designated in its entirety as 8 and shown to advantage in Fig. 3. This structure embodies side frames 9 and 10 comprising divergent base bars 11 and 12, and rearwardly and upwardly extending relatively divergent top bars 13 and 14. The top and base bars are connected at their front ends, the ends of the top bars embracing the ends of the base bars, and suitable bolts or rivets 15 or the like serve to connect said sets of bars. The rear extremities of the said top and bottom bars are connected to the seed box and drill frame, respectively, as indicated at 16 and 17. This connection may be permanent or otherwise, bolts being shown in the drawing.

In order to brace the supporting structure 8, I provide strengthening columns 18 and 19 arranged approximately intermediate the ends of the structure, rivets or the like, fastening means 20 serving to connect the extremities of said columns to the top and bottom bars. A pair or more of supplemental brace members 21 may be carried by the base bars for a purpose hereinafter set forth.

The deflecting blade or guard comprises a sheet of metal or other suitable material bent into V-shaped configuration to provide divergent sides 22 and 23 the lower marginal edges of which are connected to the base bars of the supporting structure. The front end of the guard may be inclined rearwardly as at 25 to allow objects to ride up and over the same to one side or the other.

The supplemental brace members 21 are fastened at 24 to the sides 22 and 23 of the deflector or guard in order to brace the same intermediate the top and bottom bars. The base bars 11 and 12 are preferably positioned slightly above the ground and it will therefore be seen that obstacles on the surface of the earth cannot become entangled with the planting mechanism, but are deflected out of the path of the same. It will also be readily apparent that the construction of the device is light and strong, and the same is cheap to manufacture.

While I have shown and described my invention as embodying a specific form, I desire that it be understood that changes in the details of construction may be made within the scope of the invention as claimed.

What I claim as my invention and desire to secure by Letters Patent is:

1. The combination with a planter, of a V-shaped guard blade, supporting means therefor comprising a plurality of diverging rearwardly extending base bars, a plurality of rearwardly and upwardly extending relatively divergent top bars, the said top bars embracing the bottom bars at their front ends where they are jointly connected, the said base bars and top bars being provided with a bracing means intermediate the ends thereof, and supplemental brace members connected to the said base bars intermediate the bracing means and the free ends of the base bars to brace the guard blade intermediate the top and bottom edges thereof.

2. The combination with a planter, a shoe, running wheel, and draft pole, of a guarding device comprising a tapered supporting structure extending forwardly of the planter, a V-shaped deflecting blade, including a sheet of metal bent into a V-shaped configuration, the bottom and top edges thereof being substantially parallel, the sides thereof diverging to provide means for deflecting, the front end of said deflecting blade being provided with an aperture to accommodate the forward end of said draft pole.

In testimony whereof I affix my signature hereto.

BARZILLAI C. MENDENHALL.

Copies of this patent may be obtained for five cents each, by addressing the "Commissioner of Patents, Washington, D. C."